US011220329B2

(12) United States Patent
Acee et al.

(10) Patent No.: US 11,220,329 B2
(45) Date of Patent: Jan. 11, 2022

(54) DUCTED ROTOR STATORS (71) Applicant: Bell Helicopter Textron Inc., Fort Worth, TX (US)

(72) Inventors: Aaron Alexander Acee, Flower Mound, TX (US); Andrew Paul Haldeman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 89 days.

(21) Appl. No.: 16/266,086

(22) Filed: Feb. 3, 2019

(65) Prior Publication Data
US 2020/0247535 A1 Aug. 6, 2020

(51) Int. Cl.
*B64C 27/12* (2006.01)
*B64D 33/08* (2006.01)
*B64C 27/20* (2006.01)
*F04D 29/58* (2006.01)
*B64C 27/82* (2006.01)

(52) U.S. Cl.
CPC .............. *B64C 27/12* (2013.01); *B64C 27/20* (2013.01); *B64D 33/08* (2013.01); *F04D 29/5806* (2013.01); *B64C 2027/8254* (2013.01)

(58) Field of Classification Search
None
See application file for complete search history.

(56) References Cited

U.S. PATENT DOCUMENTS

| 5,131,604 | A  | * | 7/1992  | Yoerkie, Jr. ............. B64C 27/82 244/17.19 |
| 7,900,438 | B2 | * | 3/2011  | Venkataramani ... F28D 15/0275 60/267 |
| 9,212,623 | B2 | * | 12/2015 | Murphy .................... F02K 1/46 |
| 10,400,675 | B2 | * | 9/2019  | Sennoun ................... F01D 5/18 |
| 2009/0169359 | A1 | * | 7/2009  | Murphy .................. F02K 1/822 415/115 |
| 2010/0236215 | A1 | * | 9/2010  | Venkataramani ... F28D 15/0275 60/39.093 |
| 2014/0165570 | A1 | * | 6/2014  | Herring ............... F28D 15/0266 60/730 |
| 2017/0159566 | A1 | * | 6/2017  | Sennoun ................. F02K 3/115 |

* cited by examiner

Primary Examiner — Ninh H. Nguyen
Assistant Examiner — Jason Fountain
(74) Attorney, Agent, or Firm — Lightfoot & Alford PLLC (57) ABSTRACT Systems and methods include providing an aircraft with a ducted rotor assembly. The ducted rotor assembly includes a housing having a duct, a rotor drive mechanism coupled to a rotor system, and a plurality of stators that both structurally support the rotor drive mechanism within the duct of the housing and carry a fluid through internal fluid passages in the plurality of stators to provide cooling to the rotor drive mechanism. Some of the stators carry fluid to the rotor drive mechanism, where the fluid absorbs heat from the rotor drive mechanism, and some of the stators carry fluid away from the rotor drive mechanism. The rotor system generates an airflow over the stators carrying fluid away from the rotor drive mechanism to effect transfer between the fluid and the airflow.

20 Claims, 6 Drawing Sheets

DUCTED ROTOR STATORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Rotorcraft typically use one or more ducted fans disposed on an empennage or tail boom to provide yaw stability to the rotorcraft. Ducted fans include a rotor drive mechanism that rapidly generates heat due to its high-speed rotation and prolonged operation intervals. Traditionally, these rotor drive mechanisms are either strictly air-cooled via an internal fan or fins of the housing of the rotor drive mechanism and/or "splash-lubed" by non-pressurized oil carried within the housing. However, the heat exchange limits of these prior cooling methods present several design limitations of the rotor drive mechanisms and application limitations for various rotor drive mechanisms.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
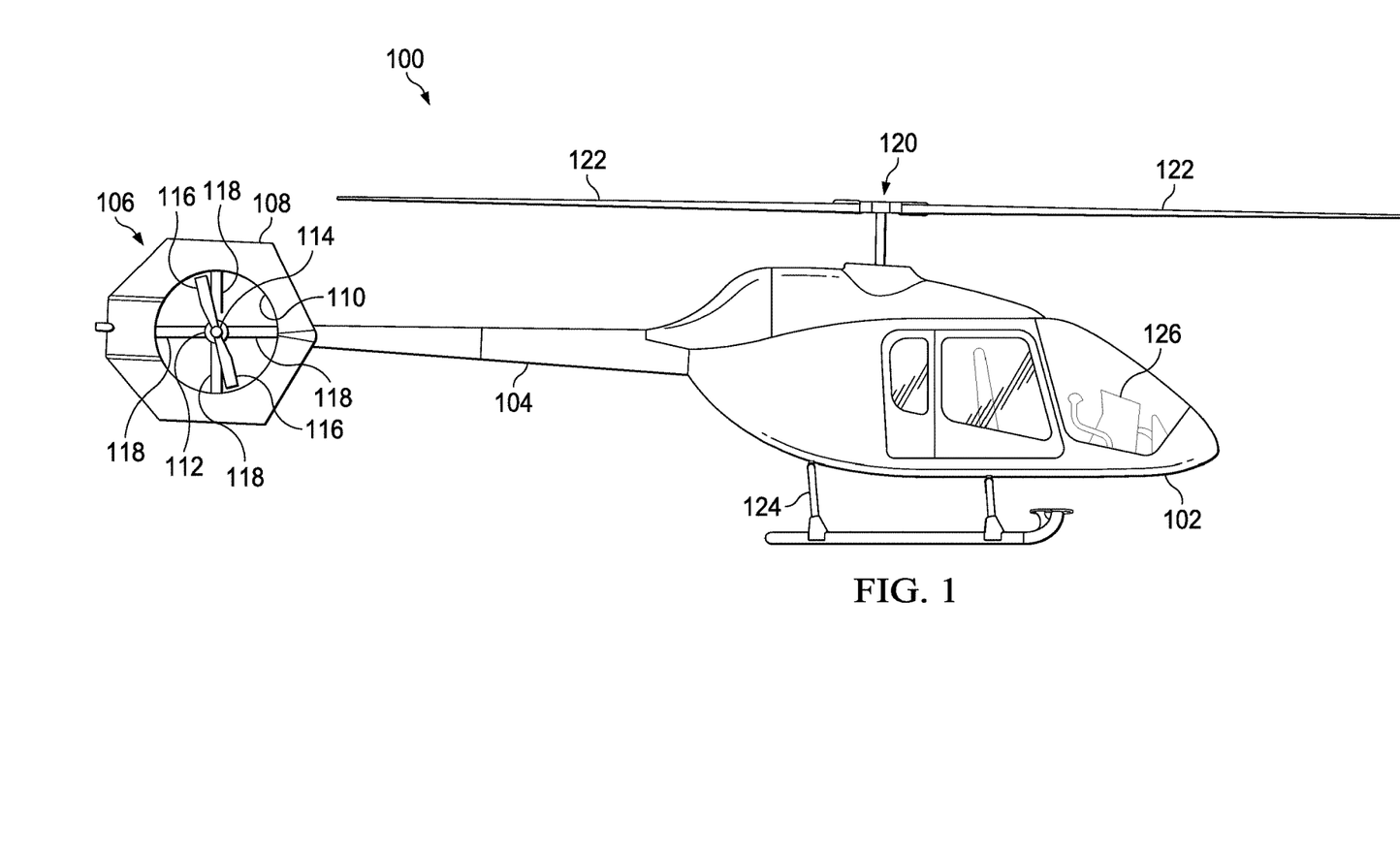
FIG. 1 is a side view of an aircraft according to this disclosure.

FIG. 1 is a side view of an aircraft 100 according to this disclosure. In the embodiment shown, aircraft 100 is a helicopter. Aircraft 100 comprises a fuselage 102 and an empennage or tail boom 104. Aircraft 100 also comprises a ducted rotor assembly 106 disposed on an aft end of the tail boom 104. The ducted rotor assembly 106 comprises a housing 108 having an aperture or duct 110 disposed through the housing 108. A rotor drive mechanism 112 (e.g., electrical motor, gearbox, etc.) is centrally disposed within the duct 110 and is coupled to and configured to provide selective rotation to a rotor system 114 comprising a plurality of rotor blades 116. The rotor drive mechanism 112 is mounted to the housing 108 of the ducted rotor assembly 106 via a plurality of stationary, structural support stators 118. Aircraft 100 further comprises a main rotor system 120 having a plurality of main rotor blades 122 that are selectively rotatable to provide vertical lift to the aircraft 100. A landing gear or skid 124 is attached to the fuselage 102 and is configured to support the aircraft 100 when the aircraft 100 is grounded. Aircraft 100 also comprises a flight control system 126, which may, for example, include hardware and/or software for controlling the aircraft 100 or other systems of the aircraft 100 during operation. Still further, while not shown, aircraft 100 may also comprise a combustion engine configured to propel the aircraft 100 during forward flight.

Figure 2:
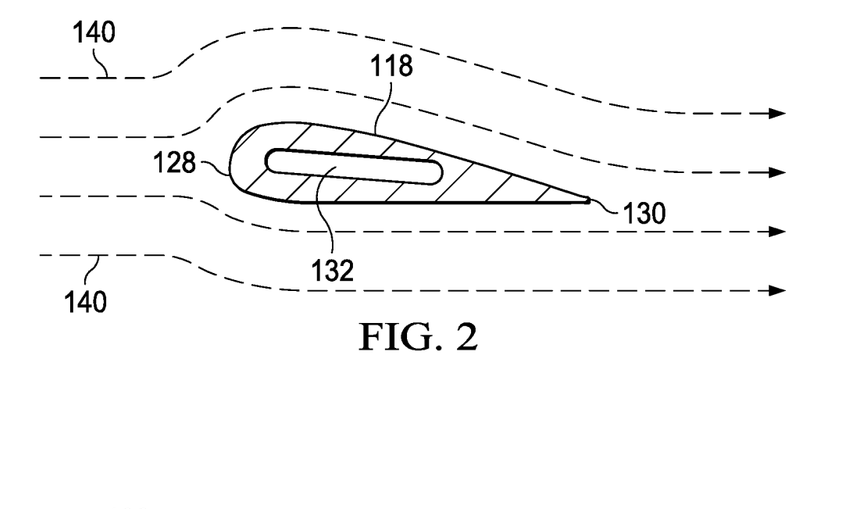
FIG. 2 is a cross-sectional side view of a stator of the aircraft of FIG. 1.

FIG. 2 is a cross-sectional side view of a stator 118 of the aircraft 100 of FIG. 1. Stator 118 comprises a leading edge 128 and a trailing edge 130. Airflow 140 generated by the rotor system 114 passes over the stator 118 from the leading edge 128 to the trailing edge 130. Because the rotor drive mechanism 112 receives airflow 140 generated by the rotor system 114, stator 118 comprises a low-drag, aerodynamic cross-sectional profile. The cross-sectional profile of the stator 118 may be symmetrical, cambered, or any other shape that allows the airflow 140 to flow over the stator 118 with low drag and/or to anti-rotate the flow from the rotor. Rotor drive mechanism 112 is carried by the plurality of stators 118 and requires cooling to operate efficiently and reliably. Typical rotor drive mechanisms are air-cooled via an internal fan or fins placed on the housing of the rotor drive mechanism 112 and/or are "splash-lubed" by non-pressurized oil carried within the housing.

To cool the rotor drive mechanism 112, stator 118 comprises an internal, fluid passage 132 disposed through the stator 118. As will be described later in more detail, fluid passage 132 is configured to carry a cooling fluid therethrough to provide liquid cooling to the rotor drive mechanism 112. In the embodiment shown, fluid passage 132 comprises a substantially similar cross-sectional profile as the outer cross-sectional profile of the stator 118. However, in some embodiments, fluid passage 132 may comprise a circular, elliptical, oval, or any other suitably shaped cross-sectional profile. Further, in some embodiments, stator 118 may comprise multiple fluid passages 132 to maximize the surface area of the fluid passages 132. Still further, the fluid passages may comprise a variety of cross-sectional shapes along the length of the stator 118. The fluid passages 132 may be formed from a composite material. However, in some embodiments, the fluid passages 132 may be formed from a metallic material (e.g., aluminum, copper, etc.).

Figure 3:
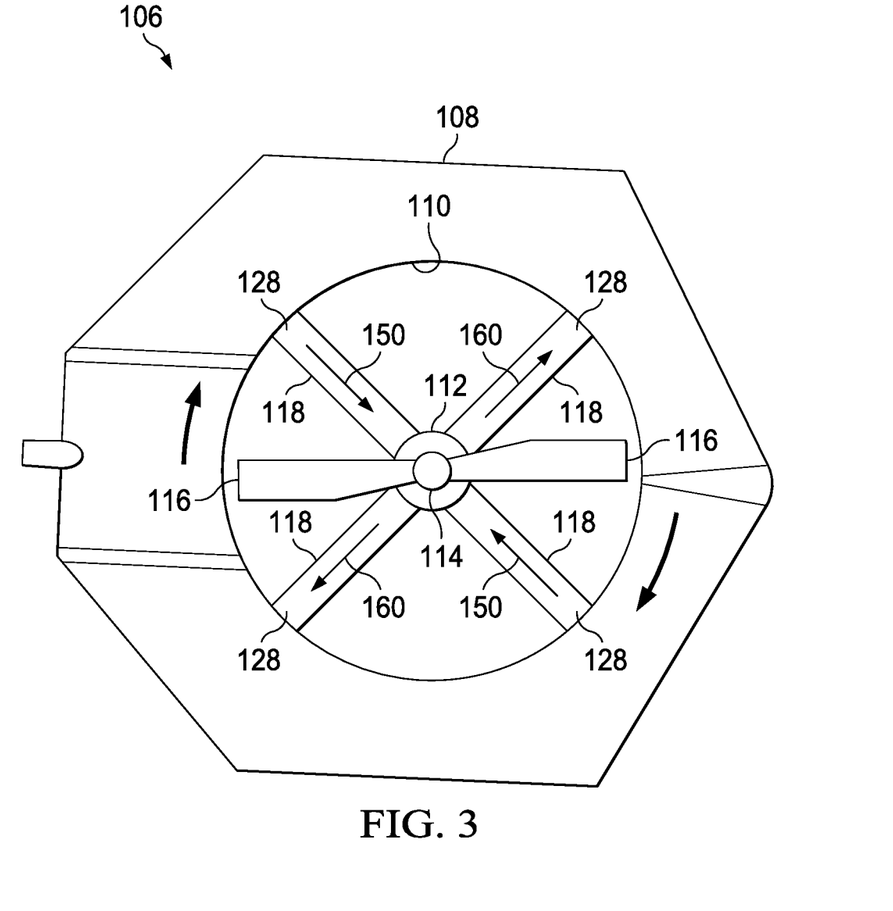
FIG. 3 is a side view of a ducted rotor assembly of the aircraft of FIG. 1.

FIG. 3 is a side view of ducted rotor assembly 106 showing the fluid flow through the fluid passages 132 of stators 118. In the embodiment shown, ducted rotor assembly 106 comprises four stators 118. As such, two opposing stators 118 carry incoming fluid 150 through their respective fluid passages 132 to the rotor drive mechanism 112, where the fluid may pass through a housing of the rotor drive mechanism 112 and absorb heat from the rotor drive mechanism 112, thereby cooling the rotor drive mechanism 112. Two other opposing stators 118 carry heated, outgoing fluid 160 through their respective fluid passages 132 away from the rotor drive mechanism 112. Airflow 140 generated by the rotor system 114 passes over the stators 118 carrying the heated, outgoing fluid 160 and absorbs heat from the outgoing fluid 160. By liquid cooling the rotor drive mechanism 112, the stators 118 can provide increased or more efficient heat transfer and cooling than traditional air-cooling or splash-lubing.

While the embodiment shown comprises four stators 118, it will be appreciated that ducted rotor assembly 106 may comprise any number of stators 118 depending on the size and/or weight of the rotor drive mechanism 112 and/or the cooling requirements of the rotor drive mechanism 112. Further, at least in some embodiments, some of the stators 118 may not comprise fluid passages 132. However, it will be appreciated that the number of stators 118 carrying incoming fluid 150 can generally equal the number of stators 118 carrying heated, outgoing fluid 160. More specifically, the volume of fluid passages 132 carrying incoming fluid 150 may generally substantially equal the volume of fluid passages 132 carrying heated, outgoing fluid 160. Generally, the total incoming fluid flow capacity provided by stators is matched to a total outgoing fluid flow provided by stators. In alternative embodiments, the number of stators associated with carrying incoming fluid may not equal the number of stators carrying outgoing fluid. It will be appreciated that stators 118 serve the dual purpose of providing both structural support and cooling to the rotor drive mechanism 112. Furthermore, by pumping pressurized fluid 150, 160 through the fluid passages 132 of the stators 118, the stators 118 remain pressurized, thereby providing additional stiffening to the stators 118 and increasing the structural support to the rotor drive mechanism 112.

Figure 4:
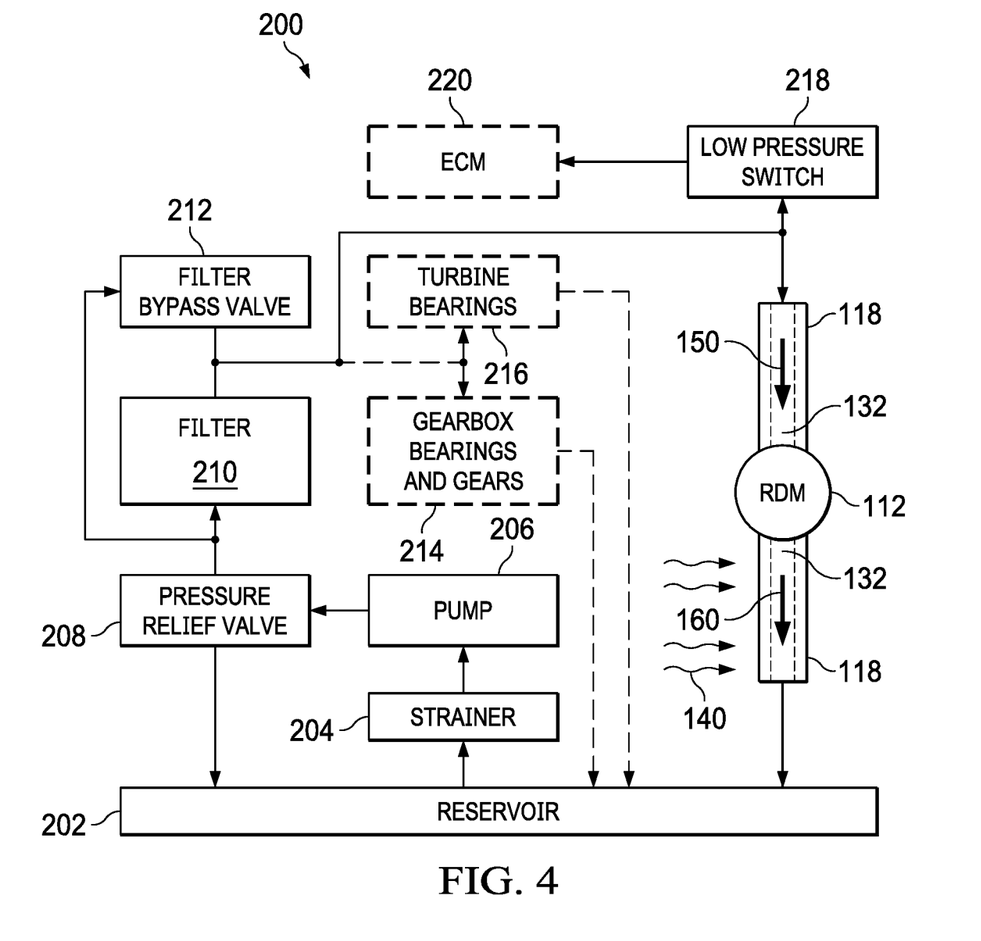
FIG. 4 is a schematic diagram of a cooling system according to this disclosure.

FIG. 4 is a schematic diagram of a cooling system 200 according to this disclosure. Cooling system 200 may generally be configured for use in aircraft 100 to provide cooling to the rotor drive mechanism 112. Cooling system 200 may generally comprise a reservoir 202 configured to store a cooling fluid. The reservoir 202 may comprise an internal volume within the housing of a gearbox or an external storage tank. In some embodiments, the cooling system 200 may comprise a strainer 204 configured to prevent contaminates or particles from entering a pump 206 configured to pump a cooling fluid (e.g., gearbox oil, water, coolant, alcohol, etc.) through the cooling system 200. Cooling system 200 also comprises a pressure relief valve 208 that may recirculate overpressurized fluid from the pump 206 to the reservoir 202. Cooling system 200 may also comprise a filter 210 configured to remove contaminants carried within the fluid and/or a filter bypass valve 212. In embodiments where the fluid is oil, the pump 206 may be configured to move the oil through gearbox bearings and gears 214 and/or turbine bearings 216 to provide lubrication to the gearbox bearings and gears 214 and/or turbine bearings 216.

Cooling system 200 also comprises a low pressure switch 218 electrically coupled to an electronic control module (ECM) 220. In some embodiments, ECM 220 may be flight control system 126 or be a component of flight control system 126. The low pressure switch 218 may provide alerts to the ECM 220 when fluid pressure in the cooling system 200 falls below a predetermined value during operation of the cooling system 200. The pump 206 is generally configured to pump incoming fluid 150 through the fluid passages 132 of the stators 118, where the fluid may absorb heat from the rotor drive mechanism 112, thereby cooling the rotor drive mechanism 112. Heated, outgoing fluid 160 is subjected, via the stators 118, to airflow 140 generated by the rotor system 114 and the airflow 140 absorbs heat from the outgoing fluid 160 before the fluid is returned to the reservoir 202. Accordingly, cooling system 200 provides a closed loop fluid circuit through which the pump 206 moves pressurized fluid through the fluid passages 132 of the stators 118 to provide cooling to the rotor drive mechanism 112.

Figure 5:
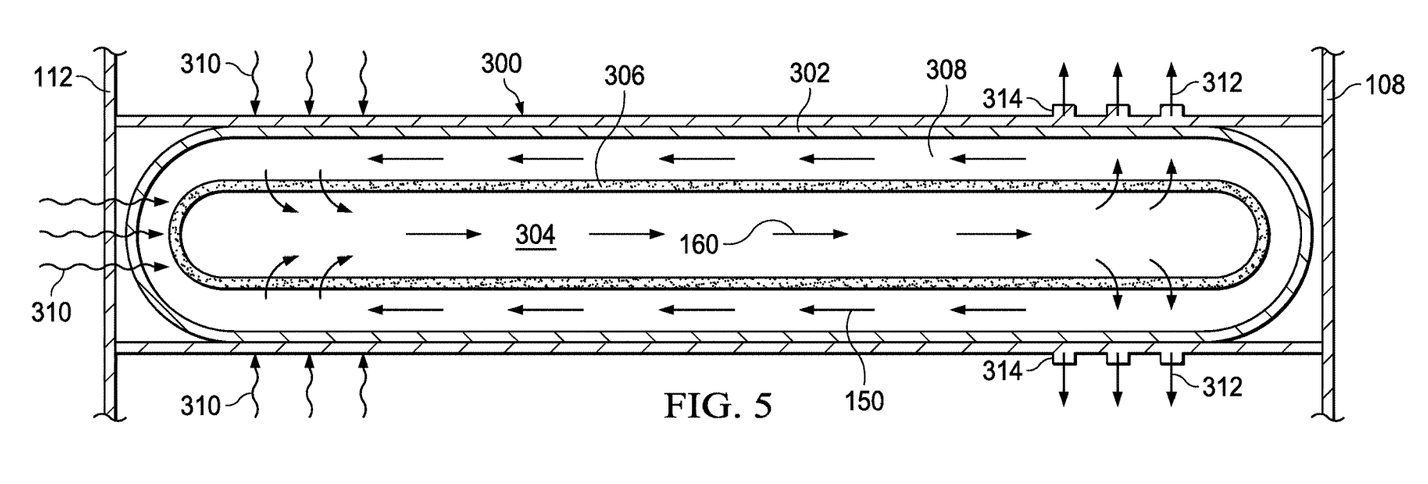
FIG. 5 is a cross-sectional front view of an alternative embodiment of a stator according to this disclosure.

FIG. 5 is a cross-sectional front view of an alternative embodiment of a stator 300 according to this disclosure. Stator 300 is substantially similar to stator 118 and is configured to be used in ducted rotor assembly 106. As shown, the housing 108 is shown on the right at an outer end of stator 300, and the rotor drive mechanism 112 is shown on the left at an inner end of the stator 300. However, instead of fluid passage 132 used in stator 118, stator 300 comprises a heat pipe 302. Heat pipe 302 comprises an internal vapor passage 304 that carries heated, outgoing fluid 160 from the rotor drive mechanism 112. Internal vapor passage 304 is surrounded by a wick 306 that separates an external liquid passage 308 from the internal vapor passage 304. External liquid passage 308 carries incoming fluid 150 towards the rotor drive mechanism 112. Incoming heat 310 from the rotor drive mechanism 112 is absorbed by the fluid in the heat pipe 302, which at least partially vaporizes. The vaporized fluid travels though the internal vapor passage 304 and condenses as outgoing heat 312 and is absorbed by airflow 140 generated by the rotor system 114. In some embodiments, stator 300 may also comprise an optional heat sink 314 disposed adjacent the housing 108 and in airflow 140 to further enhance heat transfer between the airflow 140 generated by the rotor system 114 and the fluid carried within the heat pipe 302.

As outgoing heat 312 is transferred to the airflow 140 generated by the rotor system 114, the vaporized fluid condenses and is carried through the external liquid passage 308 back towards the rotor drive mechanism 112 to continue the heat transfer cycle. Additionally, it will be appreciated that the wick 306 may also promote further heat transfer between the fluid carried in the external liquid passage 308 and the airflow 140 generated by the rotor system 114 as the fluid returns to the rotor drive mechanism 112 and as airflow 140 passes over the stator 300. In some embodiments, the fluid in the heat pipe 302 may comprise ammonia, acetone, methanol, oil, water, coolant, and/or any other suitable fluid. Additionally, it will be appreciated that the self-contained nature of heat pipe 302 may eliminate the need for additional components, such as some or all of the components of cooling system 200. Furthermore, in a manner similar to stator 118, by absorbing heat into the fluid carried by heat pipe 302, stators 300 remain pressurized, thereby providing additional stiffening to the stators 300 and increasing the structural support to the rotor drive mechanism 112.

Figure 6:
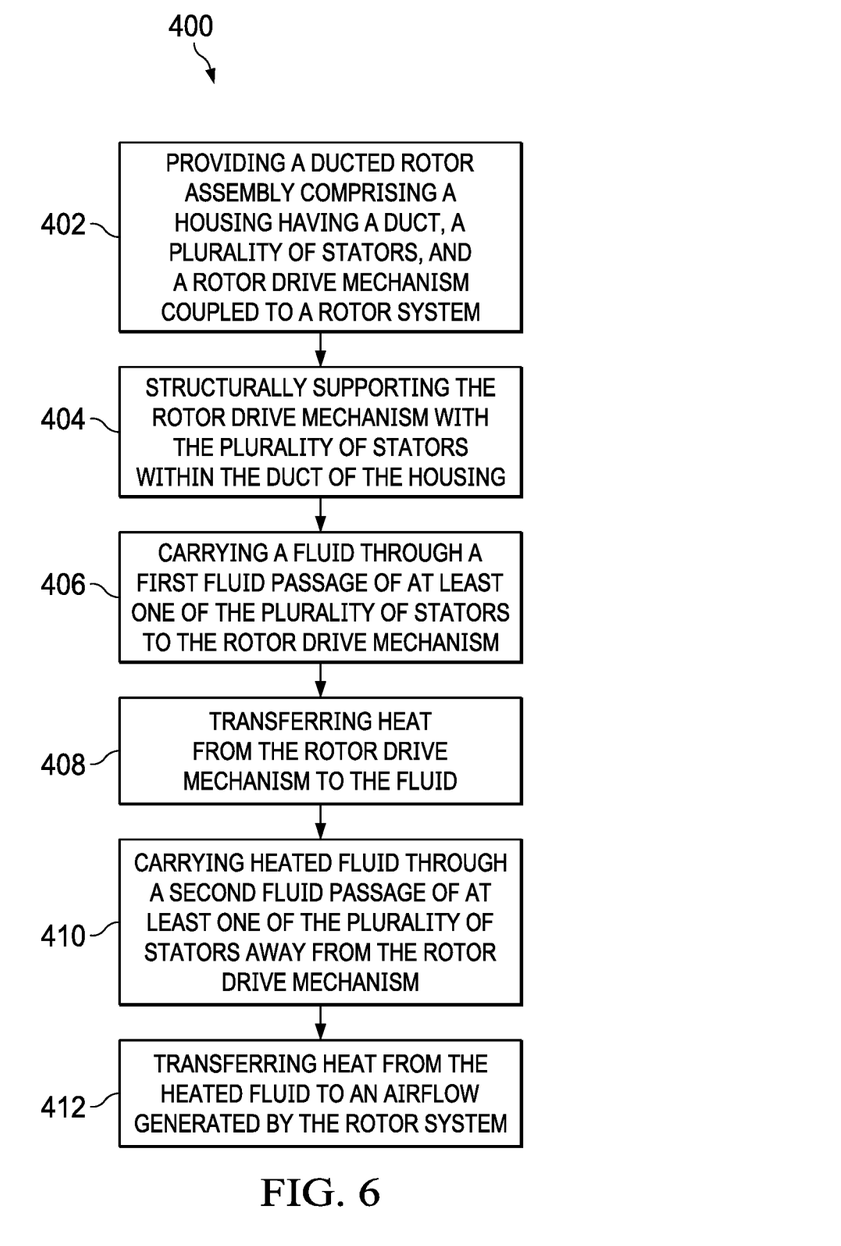
FIG. 6 is a flowchart of a method of cooling a rotor driving mechanism according to this disclosure.

FIG. 6 is a flowchart of a method 400 of cooling a rotor driving mechanism according to this disclosure. Method 400 begins at block 402 by providing a ducted rotor assembly 106 comprising a housing 108 having a duct 110, a plurality of stators 118, 300, and a rotor drive mechanism 112 coupled to a rotor system 114. Method 400 continues at block 404 by structurally supporting the rotor drive mechanism 112 with the plurality of stators 118, 300 within the duct 110 of the housing 108. Method 400 continues at block 406 by carrying a fluid through a first fluid passage 132, 308 of at least one of the plurality of stators 118, 300 to the rotor drive mechanism 112. Method 400 continues at block 408 by transferring heat from the rotor drive mechanism 112 to the fluid. Method 400 continues at block 410 by carrying heated fluid through a second fluid passage 132, 304 of at least one of the plurality of stators 118, 300 away from the rotor drive mechanism 112. Method 400 concludes at block 412 by transferring heat from the heated fluid to an airflow 140 generated by the rotor system 114.

While aircraft 100 is shown as a helicopter, it will be appreciated that the ducted rotor assembly 106 may be used in any aircraft that employs a ducted fan or ducted rotor assembly, such as other rotorcraft, vertical takeoff and landing (VTOL) aircraft, or the like. This is applicable to both "manned" and "un-manned" aircraft. Additionally, an aircraft may include one or more ducted rotor assemblies 106 having any number of stators 118, 300. The stators 118, 300 are also suitable for use with any type of ducted fan or ducted rotor assembly. Furthermore, it will be appreciated that the ducted rotor assembly 106 and/or stators 118, 300 may be retrofit with existing aircraft. Still further, depending on the rotational direction of the main rotor system 120, the ducted rotor assembly 106 may be mounted on either side of the tail boom 104 and/or configured to rotate in an appropriate direction to counter the torque produced by the main rotor system 120.

Figure 7:
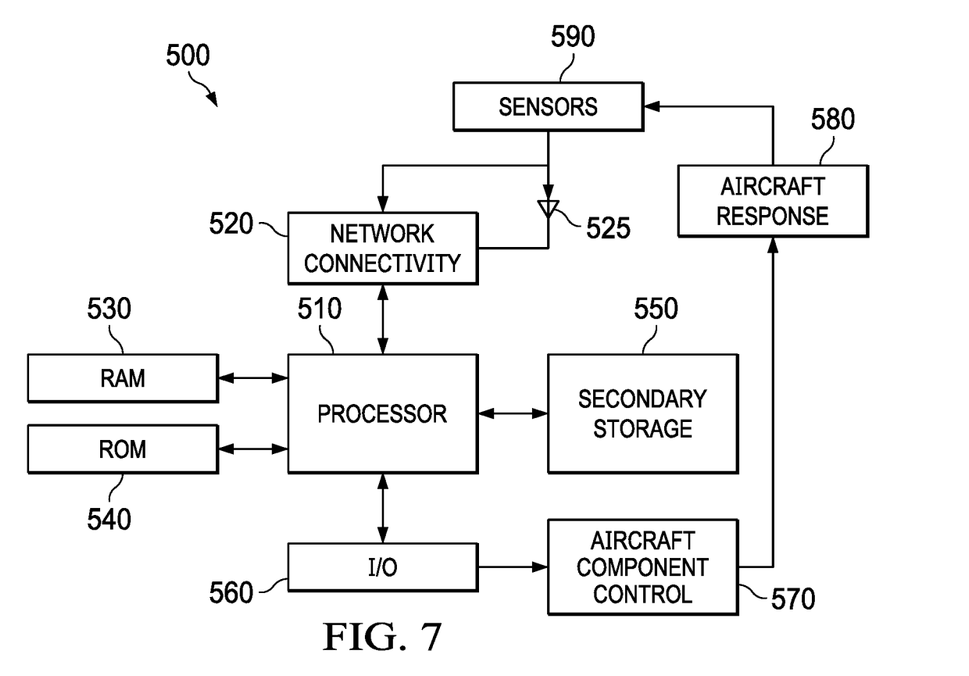
FIG. 7 is a schematic diagram of a general-purpose processor system suitable for implementing the embodiments of this disclosure.

Referring to FIG. 7, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. In particular, flight control system 126 of aircraft 100 configured to control operation of the rotor system 114, main rotor system 120, cooling system 200, and/or other electronic systems of aircraft 100 disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. System 500 may also comprise aircraft component controls 570, aircraft responses 580 (e.g., cyclic control, pitch attitude), and sensors 590 (e.g., low pressure switch 218). In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives, tape drives, or solid-state drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors 590 (e.g., low pressure switch 218), motor drive electronics, or other well-known input or output devices, such a cyclic control, collective control, and pedal inputs used by a pilot, co-pilot, or remote pilot. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the control systems (e.g., flight control system 126 of aircraft 100) and/or other electronic systems disclosed herein. Further, inputs provided through an I/O device 560, such as flight control system 126, may communicate with aircraft component control 570. Thus, flight control system 126 may provide control signals to the cooling system 200 to adjust, control, and/or maintain a flow of fluid through the fluid passages 132 of the stators 118 during flight. Feedback via aircraft response 580 and/or sensors 590 may further communicate through one or more of the network connectivity devices 520 and/or one or more transceiver components 525 to provide feedback to control aircraft 100 and its associated systems.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A ducted rotor assembly, comprising:
a housing having a duct;
a rotor drive mechanism coupled to a rotor system, the rotor system comprising an axis of rotation; and
a plurality of stators configured to structurally support the rotor drive mechanism within the duct of the housing and carry a fluid through internal fluid passages in the plurality of stators to provide cooling to the rotor drive mechanism;
wherein fluid sent toward the rotor drive mechanism via a first stator is taken away from the rotor drive mechanism via a second stator.

2. The ducted rotor assembly of claim 1, wherein at least one of the plurality of stators comprises an internal fluid passage configured to carry fluid to the rotor drive mechanism, and wherein at least one of the plurality of stators comprises an internal fluid passage configured to carry fluid away from the rotor drive mechanism.

3. The ducted rotor assembly of claim 2, wherein a total number of stators configured to carry fluid to the rotor drive mechanism is equal to a total number of stators configured to carry fluid away from the rotor drive mechanism.

4. The ducted rotor assembly of claim 2, wherein a total volume of fluid passages of the plurality of stators configured to carry fluid to the rotor drive mechanism is equal to a total volume of fluid passages of the plurality of stators configured to carry fluid away from the rotor drive mechanism.

5. The ducted rotor assembly of claim 2, wherein the fluid passes through at least a portion of the rotor drive mechanism to absorb heat from the rotor drive mechanism.

6. The ducted rotor assembly of claim 5, wherein the rotor system is configured to generate an airflow over the plurality of stators to effect transfer between the fluid and the airflow.

7. The ducted rotor assembly of claim 1, wherein the plurality of stators comprises multiple internal fluid passages.

8. The ducted rotor assembly of claim 7, wherein the plurality of stators comprises heat pipes.

9. An aircraft, comprising:
a ducted rotor assembly, comprising:
a housing having a duct;
a rotor drive mechanism coupled to a rotor system, the rotor system comprising an axis of rotation; and
a plurality of stators configured to structurally support the rotor drive mechanism within the duct of the housing and carry a fluid through internal fluid passages in the plurality of stators to provide cooling to the rotor drive mechanism;
wherein fluid sent toward the rotor drive mechanism via a first stator is taken away from the rotor drive mechanism via a second stator.

10. The aircraft of claim 9, wherein at least one of the plurality of stators comprises an internal fluid passage configured to carry fluid to the rotor drive mechanism, and wherein at least one of the plurality of stators comprises an internal fluid passage configured to carry fluid away from the rotor drive mechanism.

11. The aircraft of claim 10, wherein a total number of stators configured to carry fluid to the rotor drive mechanism is equal to a total number of stators configured to carry fluid away from the rotor drive mechanism.

12. The aircraft of claim 11, wherein the fluid passes through at least a portion of the rotor drive mechanism to absorb heat from the rotor drive mechanism.

13. The aircraft of claim 12, wherein the rotor system is configured to generate an airflow over the stators to effect transfer between the fluid and the airflow.

14. The aircraft of claim 13, further comprising: a cooling system comprising a pump configured to move pressurized fluid through the internal fluid passages of the plurality of stators to provide cooling to the rotor drive mechanism.

15. The aircraft of claim 9, wherein the plurality of stators comprises heat pipes.

16. A method of cooling a rotor drive mechanism, comprising:
providing a ducted rotor assembly comprising a housing having a duct, a plurality of stators, and a rotor drive mechanism coupled to a rotor system, the rotor system comprising an axis of rotation;
structurally supporting the rotor drive mechanism with the plurality of stators within the duct of the housing;
carrying a fluid through a first fluid passage of a first of the plurality of stators to the rotor drive mechanism;

transferring heat from the rotor drive mechanism to the fluid to result in a heated fluid;

carrying the heated fluid through a second of the plurality of stators away from the rotor drive mechanism; and transferring heat from the heated fluid to an airflow generated by the rotor system;

carrying the fluid through each independent radial support path that supports the rotor drive mechanism within the duct.

17. The method of claim 16, wherein the number of first fluid passages carrying fluid to the rotor drive mechanism is equal to the number of second fluid passages carrying fluid away from the rotor drive mechanism.

18. The method of claim 17, wherein the first fluid passages comprise external liquid passages of a heat pipe, and wherein the second fluid passages comprise internal vapor passages of a heat pipe.

19. The method of claim 16, further comprising: providing a cooling system comprising a pump; and operating the pump to move pressurized fluid through the internal fluid passages of the plurality of stators to provide cooling to the rotor drive mechanism.

20. The method of claim 16, wherein the ducted rotor assembly is a tail rotor assembly of a helicopter.

* * * * *